(12) United States Patent
Niedermeyer

(10) Patent No.: US 7,376,431 B2
(45) Date of Patent: May 20, 2008

(54) LOCATION BASED FRAUD REDUCTION SYSTEM AND METHOD

(76) Inventor: Brian J. Niedermeyer, 1941 NW. 25th, Portland, OR (US) 97210

( * ) Notice: Subject to any disclaimer, the term of this patent is extended or adjusted under 35 U.S.C. 154(b) by 896 days.

(21) Appl. No.: 10/355,557

(22) Filed: Jan. 31, 2003

(65) Prior Publication Data

US 2003/0169881 A1  Sep. 11, 2003

Related U.S. Application Data

(60) Provisional application No. 60/355,667, filed on Feb. 5, 2002, provisional application No. 60/356,861, filed on Feb. 12, 2002, provisional application No. 60/361,646, filed on Mar. 4, 2002.

(51) Int. Cl.
| | |
|---|---|
| H04Q 7/20 | (2006.01) |
| H04M 1/66 | (2006.01) |
| H04M 17/00 | (2006.01) |
| H04M 15/00 | (2006.01) |
| H04M 3/00 | (2006.01) |

(52) U.S. Cl. ............... 455/456.3; 455/410; 455/456.1; 379/145; 379/114.14; 379/189

(58) Field of Classification Search ............ 455/404.1, 455/404.2, 406, 410, 456.1, 456.2, 456.5, 455/456.6, 456.3; 379/88.17, 265.09, 900, 379/907, 145, 114.14, 189; 235/380, 382; 380/258; 701/207, 213; 705/16, 18, 26, 705/44; 726/4–6, 26–28

See application file for complete search history.

(56) References Cited

U.S. PATENT DOCUMENTS

| | | | | |
|---|---|---|---|---|
| 5,878,337 | A * | 3/1999 | Joao et al. | 455/406 |
| 6,612,488 | B2 * | 9/2003 | Suzuki | 235/380 |
| 6,813,608 | B1 * | 11/2004 | Baranowski | 705/6 |
| 6,832,721 | B2 * | 12/2004 | Fujii | 235/382 |
| 6,868,391 | B1 * | 3/2005 | Hultgren | 705/26 |
| 7,013,149 | B2 * | 3/2006 | Vetro et al. | 455/456.1 |
| 7,167,711 | B1 * | 1/2007 | Dennis | 455/456.1 |
| 2002/0020741 | A1 * | 2/2002 | Sakaguchi | 235/380 |
| 2002/0108062 | A1 * | 8/2002 | Nakajima et al. | 713/201 |
| 2002/0140542 | A1 * | 10/2002 | Prokoski et al. | 340/5.52 |
| 2002/0188535 | A1 * | 12/2002 | Chao et al. | 705/35 |
| 2003/0112942 | A1 * | 6/2003 | Brown et al. | 379/196 |
| 2003/0135463 | A1 * | 7/2003 | Brown et al. | 705/44 |

* cited by examiner

*Primary Examiner*—Barry Taylor
(74) *Attorney, Agent, or Firm*—Schwabe, Williamson & Wyatt, P.C.

(57) ABSTRACT

Likelihood of fraud is reduced by having at least one of an identifier of a location from where a request is submitted or information that can lead to identification of the location, submitted with or in addition to a request. Then, determination is made to whether to service the request, based at least in part on the location from where the request is submitted. In various embodiments, the location may be compared against predetermined permissible location(s) or a current user location. The request may be a request to charge an amount against an account, such as a credit card account, a request to access a physical resource, such as a VPN, or an informational resource, such as account information, or a request to access a secured area.

16 Claims, 4 Drawing Sheets

LOCATION BASED FRAUD REDUCTION SYSTEM AND METHOD

RELATED APPLICATION

This application is a non-provisional application, claiming priority to:

(a) U.S. Provisional Application, No. 60/355,667, filed on Feb. 5, 2002, having the same title;

(b) U.S. Provisional Application, No. 60/356,861, filed on Feb. 12, 2002, having the same title; and (c) U.S. Provisional Application, No. 60/361,646, filed on Mar. 4, 2002, having the same title.

To the extent where the disclosures are complementary and supportive of the present specification, specifications of the enumerated provisional applications are hereby fully incorporated by reference.

FIELD OF THE INVENTION

The present invention relates generally to fraud reduction, and in particular, to a request processing system and method for request to enter a financial transaction, access of physical/informational resources, and access of secured area.

BACKGROUND OF THE INVENTION

Credit account fraud costs companies millions of dollars per year. Additionally, companies spend large amounts of time and money trying to reduce credit account fraud. Many transactions involving credit accounts and credit cards occur via the Internet every day. Establishing the identity of the person using a credit card or credit account via the Internet is nearly impossible.

Currently, in the credit card industry there are several ways to help merchants verify that credit card information is actually coming from the cardholder and not a person trying to commit fraud. Unfortunately, none has proven to be effective all of the time.

One method is ZIP code verification. This process occurs when either a website prompts a cardholder to enter their billing ZIP code when completing a purchase form or when an operator verbally requests this information during a telephone transaction. When an order is placed, a match or no match is given based on whether or not the accurate ZIP code information was given.

Another fraud prevention method is additional number verification. Credit card issuers are now including extra digits on cards that are only visible to someone physically holding a card. These numbers usually appear on the front or back of a card. The idea behind this security measure is that only the person holding the card would have access to these numbers. For example, if a thief stole a credit card receipt it could contain the account number and the expiration date, but would not have these extra digits.

The problem with these verification methods is they are not fool proof in preventing fraud in the case where someone has physically stolen the card, piece of mail, or a company's internal database.

Similar problems exist for controlling access to usage of physical/informational resources, and access of secured areas.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes transaction and access control devices and systems equipped to reduce the likelihood of fraud.

Parts of the description will be presented in terms, such as payment device, payment device reader, payment processing system, location, transaction, access request, and so forth, consistent with the manner commonly employed by those skilled in the art to convey the substance of their work to others skilled in the art.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may.

The terms "comprising", "having" and "including" are synonymous, unless the context dictates otherwise.

Figure 1:
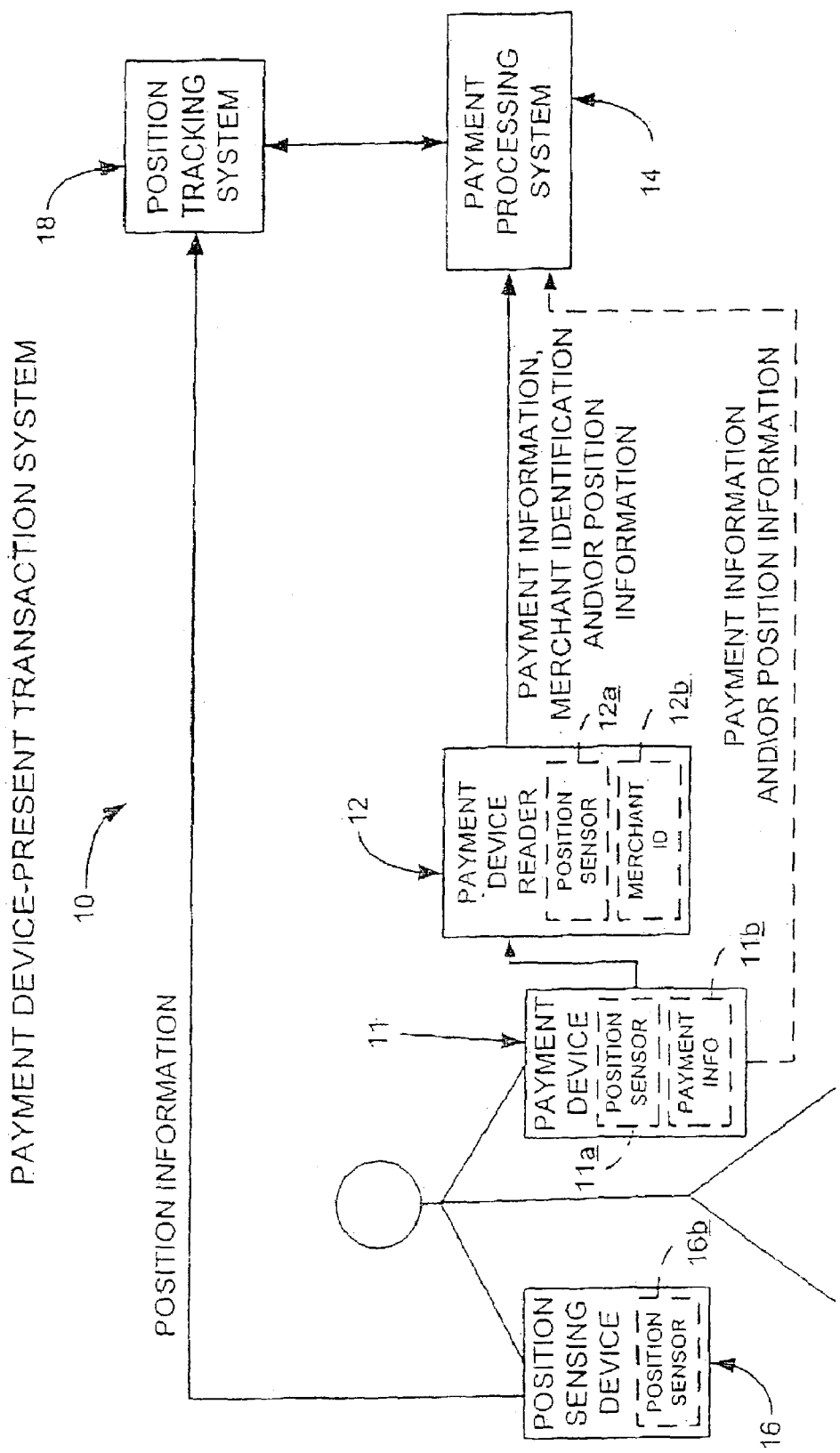
FIG. 1 is a schematic view illustrating a payment device present transaction according to one embodiment of the present invention.

As shown in FIG. 1, a payment device-present transaction system 10 is provided according to one embodiment of the present invention. Payment device-present transaction system 10 typically includes a payment device 11 configured to be read by a payment device reader 12. An example of a payment device 11 is a credit or debit card, but may alternatively be a mobile commerce device (such as an mobile commerce enabled mobile telephone) configured to transmit payment information to credit device reader via an infrared or other communication link. In one embodiment, payment device 11 may include a position sensor 11a, as well as payer information 11b.

The term "mobile telephone" as used herein (in the specification and in the claims) refers to the class of telephone devices equipped to enable a user to make and receive calls wirelessly, notwithstanding the user's movement, as long as the user is within the communication reach of a service or base station of a wireless network service provider. Unless specifically excluded, the term "mobile telephone" is to include the analog subclass as well as the digital subclass (of all signaling protocols).

The payment device reader 12 typically includes a position sensor 12a and merchant related information, such as a merchant identifier, 12b. Typically, payment device reader 12 is configured to send payer and payment information, merchant information (such as merchant identifier), and/or position information to a payment processing system 14, to request an amount to be charged against the account of payer for the transaction.

Alternatively, payment device 11 may be a mobile commerce device configured to directly transmit payer, payment, payee, and/or position information to payment processing system 14, to request an amount to be charged against the account of payer for the transaction.

Further, in alternate embodiment, in lieu of an identifier of the location of the transaction, i.e. the location from where the request is submitted, information leading to the identifying of the location, e.g. name and branch of the merchant, may be sent instead. The payer information etc. may be sent as part of the request or after an initial request for the transaction.

Payment processing system 14 is configured to determine the location or position of the payment device and/or payment device reader by the position information received from payment sensor 11a or 12a. In one embodiment, payment processing system 14 is implemented with a conventional computing system having storage medium having stored therein programming instructions implementing the teachings of the present invention, and one or more processor to execute the programming instructions.

Alternatively, the payment processing system 14 is configured to detect the position of the payment device reader (and therefore, the position of the payment device in a payment device-present transaction), by resolving merchant information (such as the merchant identifier) using a database of known merchant locations. For example, a merchant having the merchant identifier 1234567 may correspond to a convenience mart on the corner of 5$^{th}$ and Vine streets in a particular town.

For the illustrated embodiment, system 10 further includes a position-sensing device 16 having a position sensor 16b. Position-sensing device 16 may be a mobile telephone, watch, jewelry, computing device, global positioning unit, or other device including a position sensor 16b. Typically, except for its novel employment to prevent fraud under the present invention, position-sensing device 16 is otherwise not involved in payment related to the transaction entered into by payment device 11.

The position-sensing device 16 is configured to send position information to a position tracking system 18. The communication link between position tracking system 18 and position-sensing device 16 may be a satellite link such as used in a global positioning satellite system, radio frequency link, optical link such as infrared, or virtually any other communication link suitable for use in position detection.

Position tracking system 18 is configured to communicate the position information for the position-sensing device 16 to payment processing system 14.

To detect a fraudulent use of payment device 11, payment processing system 14 is configured to compare the position of position-sensing device 16 to the location or position of a current transaction involving payment device 11 (i.e., the location or position of payment device 11 and/or payment device reader 12).

If the locations of the position-sensing device 16 and the payment device 11 are different, or alternatively, if the locations of the of the position-sensing device 16 and the payment device reader 12 are different, then the payment processing system is configured to determine that there is a possibility of fraud in the current transaction. Upon determining the possibility of fraud, the payment processing system is configured to take a designated action, such as preventing the completion of the transaction.

The requirement of the possession of the payment device and the position sensing device may be referred to as "double custody" fraud prevention or reduction.

The above embodiment is especially useful for face to face transactions. A cardholder may carry a device that has a built-in position locator within it. The device may be a cell phone, watch, jewelry, wallet, or any other item that a locator could be placed in and that a person would normally carry. The device may even change from day to day. For example, some people currently have three cell phones from various companies and each has a unique feature. One may be extremely compact, one may be large, but can send and receive emails, and the third may have a long battery life. Depending on the needs for a particular day, a person may choose to use one of the three phones and with companion a location device. There may be three phones, but maybe only one location device.

The location device may e.g. be watch. The location device may be integrated with or removably associated with the watch. The cardholder would inform the credit card company ahead of time, as to the identification number/model of the location device. Once this information is given, the information may be entered into the database, and the system is primed to prevent fraudulent use of a credit card.

The cardholder may turn the watch's tracking device on or off at their leisure, as you can with a cell phone. When the watch's tracking device is on, the database would contain the current location, such as, the coordinates of the watch (during a transaction).

When the cardholder decides to make a purchase e.g. at the Portland airport (PDX), the cardholder may turn the tracking device on and the database would be provided with the location information of the watch and its owner.

The merchant's machine may send out information about the transaction to the processing company, including the merchant's location. In this case, the location is PDX. The processing system may access the database to verify the merchant's location against the watch's location and registers that the watch is also at PDX and gives a match to permit the transaction to be completed.

Similarly, the above embodiment may be applied to wireless portable Point-Of-Sale (POS) terminals. Individuals may be provided with their own personal portable terminals equipped to provide location information. The merchant's POS terminal may also be portable, and therefore may be relocated and use in a weekly or monthly specialty, fruit or produce market. In like manner, transactions conducted under this "transient" market environment may also be accorded the added fraud prevention as earlier described.

The location information obtained may be used for other purposes besides fraud prevention. Cardholders may access online statements that create a picture of their transaction history. When a cardholder clicks on a particular transaction on their bill, they may have the option to look at a map or satellite overlay of the city and view where the transaction took place. A customer may create a trip diary based off purchases in a set period of time.

It is also believed this system, in some parts, may be used for tracking corporate card user movements.

Figure 2:
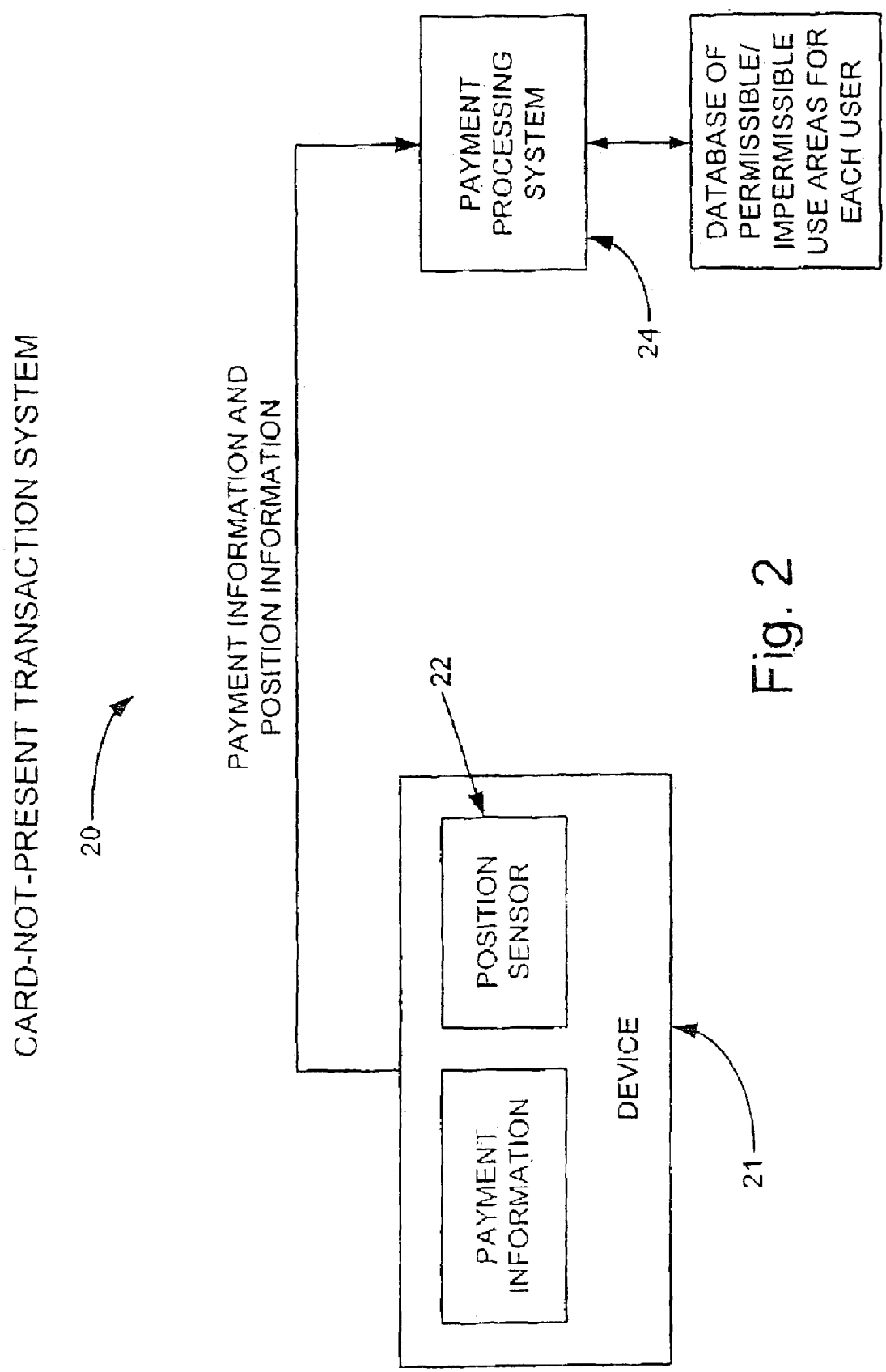
FIG. 2 is a schematic view, according to another embodiment of the present invention, showing a payment device-not-present transaction.

FIG. 2 shows a payment-device-not-present transaction system 20 according to another embodiment of the present invention. Payment-device-not-present transaction system 20 typically includes a device 21 that is capable of transmitting position information to a payment processing system 24. Typically, device 21 is a mobile telephone or a computing device configured to detect its position as well as to enter into payment transactions using on-board payment information. Payment-device-not-present transaction system 20 typically is configured to enable a user to enter into transaction, such as making a purchase by mobile telephone, or by a computing device (PDA, laptop, desktop, web-enabled mobile telephone, etc.) over a computer network, or in another manner in which the user is not required to present a payment device, such as a credit card at the point of sale.

Device 21 may include an interface configured to be used to input transaction data for a transaction, such as a purchase, to be entered into by the user. This transaction data may include payer information, items to be purchased, payment information etc. Device 21 may also include a position sensor 22 configured to detect a position of the device and send this position information to payment processing system 24 via a wireless or a wireline communication link. Thus, device 21 is typically configured to send substantially simultaneously the transaction data and position information to payment processing system 24. Payment processing system 24 includes an associated database of permissible and/or impermissible use areas for a particular user's device 21.

Payment processing system 24 is configured to check position information of the device 21 against the permissible and/or impermissible use areas for each user, and thereby determine if the device is being used in an impermissible use area for the user. If so, the system 24 is configured to indicate that a possibility of fraud exists in the pending transaction. If the possibility of fraud is detected, the system may be configured to take an action, such as preventing fulfillment of the transaction due to the possibility of fraud.

The payment processing system may be implemented with conventional computing system with storage medium having programming instructions designed to implement the present invention, and one or more processors to execute the programming instructions.

The above embodiment is particularly useful in preventing fraud in e-commerce transactions over a public network, such as the Internet. Typically, when a cardholder orders a product or service via the Internet or telephone, there is no good way to know, in real-time, where that person and credit card are. A thief in Baltimore could be using an Oregonian's card information.

Under the present invention, when a cardholder is issued a card, the cardholder may be asked to give the geographic location of their home and office, as well as any other locations that the cardholder frequently place on-line orders and use the credit card. This information may be obtained during the application process or on an ongoing basis. The information may be entered into a database.

Thus, when an on-line order is placed through a device equipped to also sense and provide current location information to the order processing system, the order processing system may check the database for whether the transaction is being conducted from a permissible location. If the transaction is not being conducted from a permissible location, the transaction may be rejected. Additionally, a warning in the form of a message and/or a call may be provided to the cardholder.

The embodiment may also potentially assist in the capturing of a credit card thief attempting to perpetrate the fraudulent transaction. If the credit card thief is making the fraudulent transaction from a device equipped to provide location information as described above, the location information could pin point where the transaction was initiated, making apprehension easier.

Figure 3:
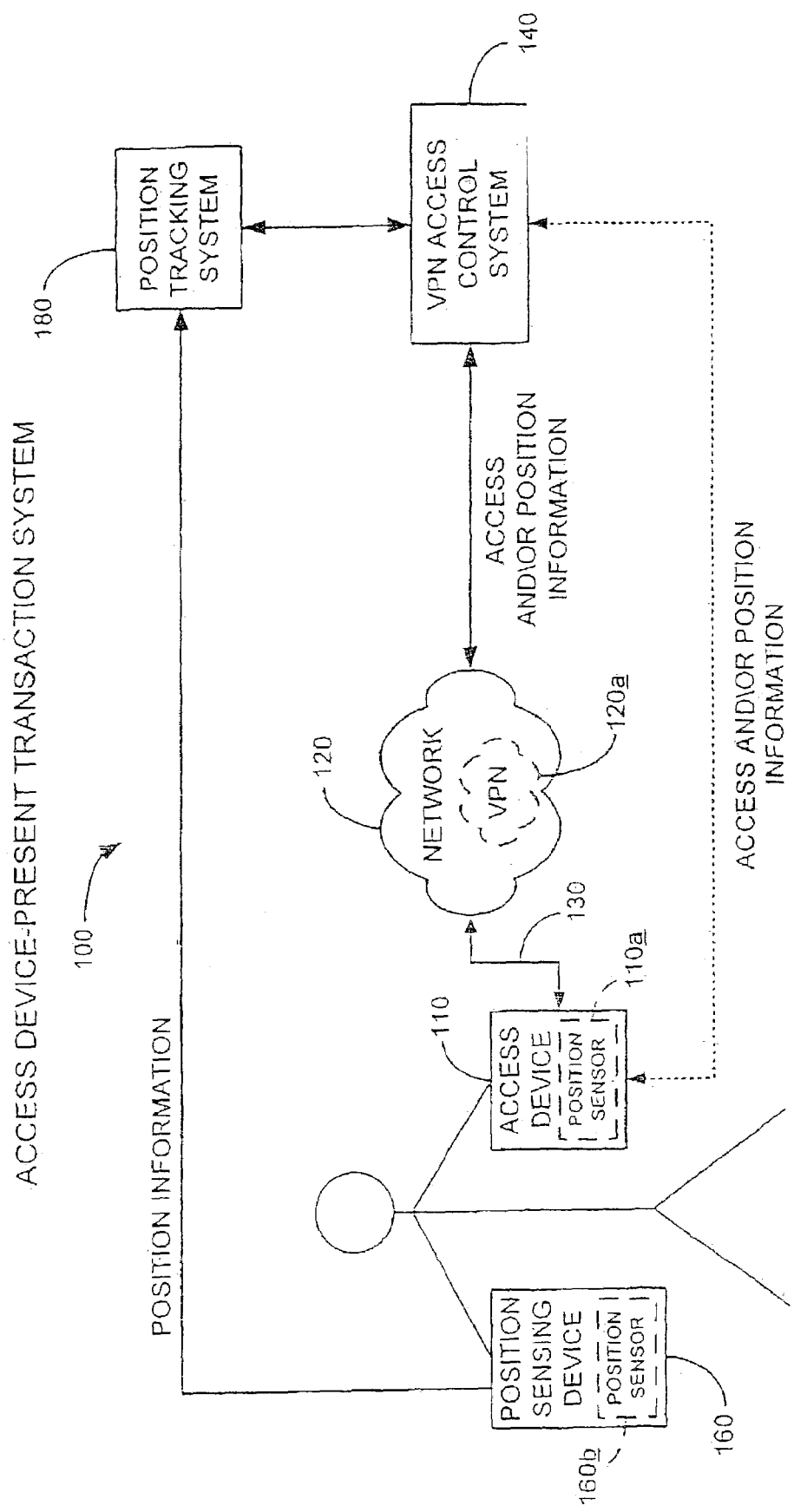
FIG. 3 is a schematic view illustrating an access device-present transaction according to one embodiment of the present invention.

As shown in FIG. 3, an access device-present transaction system 100 is provided according to one embodiment of the present invention. System 100 is typically configured to use location indicators, alone or in combination with other parameters, to determine whether or not a user may operate on a particular virtual private computer network. Access device-present transaction system 100 typically includes an access device 110 configured to access network 120. The access device 110 may be a laptop, PDA, cell phone, or any other type of computing device configured to access a computer network, such as network 120, which may be the Internet.

Device 110 typically includes position sensor 110a, and may be connected to network 120 via a communication link 130. Communication link 130 may be a wireless, radio, optical, USB, or virtually any other link that allows device 110 to communicate with network 120.

Upon establishment of link 130, device 110 is further configured to communicate with and/or operate on a variety of sub-networks, websites, etc. on network 120.

The network 120 typically includes a virtual private network (VPN) 120a and is configured to allow access device 110, and similar devices to communicate with, and/or operate on VPN 120a.

Upon being accessed by device 110, VPN 120a is configured to send access and/or position information of device 110 to a VPN access control system 140. In alternate embodiments, the access and/or position information of device 110 may be provided to VPN access control system 140 directly.

System 140 is configured to use the access and/or position information received from VPN 120a and/or information directly from device 110, along with position information received from position tracking system 180, discussed below, to determine if device 110 may operate on network 120a.

System 100 further includes a position-sensing device 160 having a position sensor 160b. Position-sensing device 160 may be a mobile telephone, watch, jewelry, computing device, global positioning unit, or other device including a position sensor 160b. Typically, except to facilitate access device 110 in gaining access to VPN 120a, position-sensing device 160 is otherwise not involved in the access of VPN 120a by access device 110.

The position-sensing device 160 is configured to send position information to a position tracking system 180. The communication link between position tracking system 180 and position-sensing device 160 may be a satellite link such as used in a global positioning satellite system, radio frequency link, optical link such as infrared, or virtually any other communication link suitable for use in position detection. Position tracking system 180 is configured to communicate the position information for the position-sensing device 160 to VPN access control system 140.

To allow a user of access device 110 to operate on VPN 120a, VPN access control system 140 is configured to compare the position of position-sensing device 160 to the location or position of access device 110. If the locations of the position-sensing device 160 and the access device 110 are different, or alternatively, if the location of the access device 110 is outside of some predetermined acceptable location, then the VPN access system is configured to determine that there is a possibility of an improper use of device 110, with respect to VPN 120a.

Upon determining the possibility of improper use, the VPN access control system is configured to take a designated action, such as preventing access device 110 from operating on VPN 120a. In instances where position information is obtained directly from access device 110, control system 140 may be further configured to compare this information with that obtained from tracking system 180 and use it to either admit or deny access to access device 110 on VPN 120a, prior to the establishment of a communication link between the two.

The access control system may be implemented with conventional computing system with storage medium having programming instructions designed to implement the present invention, and one or more processors to execute the programming instructions.

Figure 4:
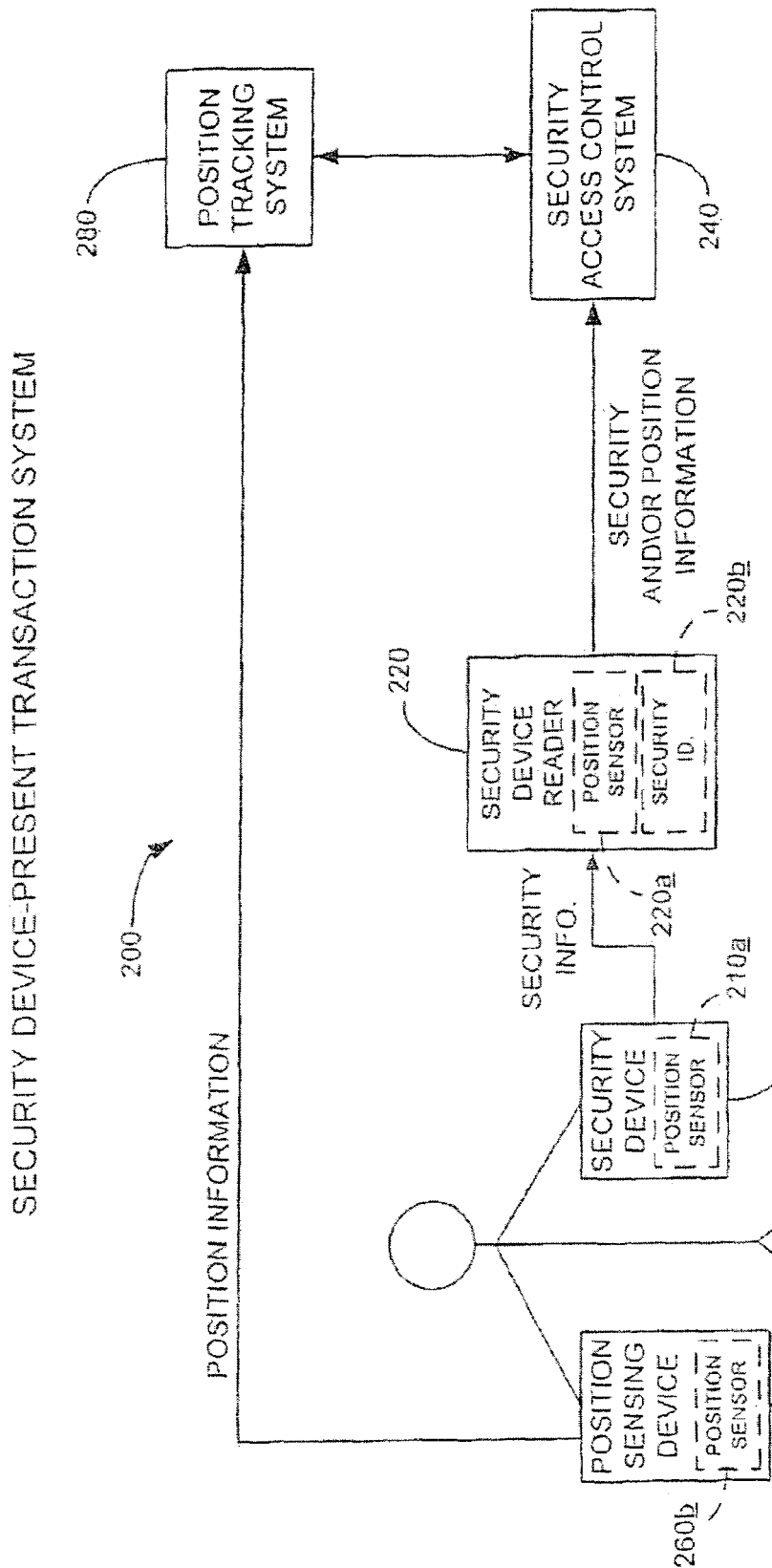
FIG. 4 is a schematic view illustrating a security device-present transaction according to one embodiment of the present invention.

As shown in FIG. 4, a security device-present transaction system 200 is provided according to one embodiment of the present invention. System 200 is typically configured to use location indicators, alone or in combination with other parameters, to determine the security clearance for access to a particular secured location. Security device-present transaction system 200 typically includes a security device 210 configured to be read by a security device reader 220. Security device 210 may be a card or badge encoded with security information, such as an access code.

Alternatively, the security device may be a mobile device (such as a mobile telephone) configured to transmit security information to security device reader 220 via an infrared or other communication link. Further, the security device may be any other device capable of providing the appropriate security and position information to security device reader 220. In particular, security device 210 may include a position sensor 210a, configured to transmit information about its relative geographical location.

The security device reader 220 is typically configured to read security device 210, and to transmit security information received there from, to a security access control system 240. Typically, security access control system 240 knows the location of security device reader 220. Alternatively, security reader 220 may include a position sensor 220a and may be configured to send position information, along with security information, to security access system 240. Alternatively, security device 210 may be a mobile device configured to directly transmit security and/or position information to security access control system 240 via a wireless link.

Security access control system 240 is further configured to detect the location or position of security device 210 and/or security reader 220 by the position information received from position sensors 210a, and/or 220a. Alternatively, the security access control system 240 is configured to detect the position of the security device reader (and therefore the position of the security device in a device-present transaction), by resolving a security identifier 220b using a database of known security identifier locations. For example, the security identifier 1234567 may correspond to a gated entrance to a secured building.

System 200 further includes a position-sensing device 260 having a position sensor 260b. Position-sensing device 260 may be a mobile telephone, watch, jewelry, computing device, global positioning unit, or other device including a position sensor 260b. Typically, except for facilitating validation of the usage security device 210, position-sensing device 260 is otherwise not involved in the transaction entered into between security device 210 and security access control system 240 (via security reader 220), or similar transactions.

The position-sensing device 260 is configured to send position information to a position tracking system 280. The communication link between position tracking system 280 and position-sensing device 260 may be a satellite link such as used in a global positioning satellite system, radio frequency link, optical link such as infrared, or virtually any other communication link suitable for use in position detection. Position tracking system 280 is configured to communicate the position information for the position-sensing device 260 to payment processing system 240.

In order to detect an improper use of security device 210, security access control system 240 is configured to compare the position of position-sensing device 260 to the location or position of a current transaction involving security device 210 (i.e., the location or position of security device 210 and/or security device reader 220). If the locations of the position-sensing device 260 and the security device 210 are different, or alternatively, if the locations of position-sensing device 260 and security reader 220 are different, then the security access control system is configured to determine that there is a possibility of improper use of the security device in the current transaction.

Upon determining the possibility of improper use, the system 240 is configured to take a designated action, such as warning a security attendant and/or by automatically locking an entrance to a secured area.

The security control system may be implemented with conventional computing system with storage medium having programming instructions designed to implement the present invention, and one or more processors to execute the programming instructions.

Conclusion and Epilogue

Thus, it can be seen from the above descriptions, various novel location based method and apparatus for fraud prevention or reduction, including "double custody" methods, have been described.

While the present invention has been described in terms of the foregoing embodiments, those skilled in the art will recognize that the invention is not limited to the embodiments described. The present invention can be practiced with modification and alteration within the spirit and scope of the appended claims.

In particular, the present invention may be practiced to control access to physical resources or spaces without the employment of separate location sensor device, similar to the embodiment of FIG. 2 as an alternative to the embodiment of FIG. 1.

Further, the present invention may be employed selectively for only certain high value transactions, usages or accesses. Rules may be pre-established to facilitate identification of the higher value transactions, usages or accesses, and trigger the application of the present invention.

Yet further, the present invention may be used to accumulate the locations where the transactions are occurred, and a user may access the accumulated information to create a geographic picture or diary of the transactions conducted over a selected period.

Thus, the description is to be regarded as illustrative instead of restrictive on the present invention.

What is claimed is:

1. A request processing method with reduced likelihood of fraud, comprising a request processor:
   receiving a request submitted by a user for access to data through an access device,
   receiving a location identifier or information that can lead to identification of the location, said identifier or information being provided by a position-sensing device selected by the user from a group of eligible devices prior to submitting the request, the position-sensing device being different from the access device, and information identifying the selected position-sensing device being received by the request processor in advance of the request processor receiving the request submitted by the user, and
   determining whether to service the request based at least in part on the received identification of the location from where the request is initiated received from the selected position-sensing device.

2. The method of claim 1, wherein said determining by the request processor comprises the request processor accessing a database having one or more permissible locations from where said request may be submitted, and comparing the location from where the request is submitted against the permissible location(s) from where said request may be submitted.

3. The method of claim 1, wherein
   said determining by the request processor comprises the request processor comparing the location from where the request is submitted with the current location of the user.

4. The request processing method of claim 1, wherein said request for access to data comprises a request to access a virtual private network.

5. A request processing system with reduced likelihood of fraud, comprising:
   a computer storage medium having stored therein a plurality of computer programming instructions designed to
      receive information identifying a selected position-sensing device to be used by a user;
      receive a request from the user for access to data through an access device,
      receive an identification of a location or information that can lead to identification of the location from where the request is initiated, said identification or information being provided by the selected position-sensing device selected by the user from a group of eligible devices prior to submitting the request, the selected position-sensing device being different from the access device, and
      determine whether to service the request based at least in part on the location from where the request is initiated received from the selected position-sensing device; and
   a processor coupled to the computer storage medium to execute the plurality of computer programming instructions.

6. The system of claim 5, wherein the programming instructions are further designed to perform said determining by accessing a database having one or more permissible locations from where said request may be submitted, and comparing the received location against the permissible location(s) from where said request may be submitted.

7. The system of claim 6, wherein the programming instructions are further designed to receive and store a permissible location in said database.

8. The system of claim 5, wherein said request for access to data comprises a request to access a virtual private network.

9. A request processing method with reduced likelihood of fraud, comprising a request processor:
   receiving in advance of one or more transactions identification information of a selected position-sensing device, said selected position-sensing device having been selected by a user from a group of eligible devices to be used for location verification for said one or more transactions;
   receiving a request submitted through an access device that is different from the position-sensing device to charge an amount against an account for at least one of said one or more transactions; and
   determining whether to service the request, based at least in part on the received identification of the location from where the request is initiated and a corresponding location of the position-sensing device.

10. The method of claim 9, wherein said group of eligible devices includes a cell phone, a watch, jewelry, and a wallet.

11. A method, comprising:
   receiving a request by a request processor to charge an amount against an account for at least one transaction;
   receiving with or in addition to the request a location identifier or information that can lead to identification of the location from where the request is being submitted;
   the request processor servicing the request based at least in part on the received identification of the location from where the request is initiated; and
   subsequent to the request being serviced, the request processor facilitating a map or satellite view to be viewed by a user, said map or satellite view being of an area including and identifying the location from where the request was initiated and/or where the request was serviced.

12. The method of claim 11, wherein said facilitating a map or satellite view to be viewed by a user comprises the request processor receiving an identification of selection of a particular transaction selected by the user from a transaction history provided to the user and forming a resultant map or satellite view of an area including and identifying the location from where the request was initiated and/or where the request was serviced for the particular selected transaction.

13. The method of claim 12, wherein said transaction history provided to the user is in the form of an online statement accessible by the user.

14. The method of claim 11, wherein the location identifier or information that can lead to identification of the location from where the request is being submitted is provided by a position-sensing device selected by the user from a group of eligible devices prior to the request processor receiving the request, and wherein information identifying the selected position-sensing device is received by the request processor prior to the request processor receiving the request.

15. The method of claim 14, wherein said group of eligible devices includes a cell phone, a watch, jewelry, and a wallet.

16. The method of claim 14, wherein the request to charge an amount against an account is submitted by an access device that is different from the position-sensing device.

* * * * *